Jan. 3, 1928. 1,654,794
C. A. COYLE
FLUID TRANSMISSION
Filed Oct. 17, 1922 3 Sheets-Sheet 1

Chas. A. Coyle Inventor
Gray & Lilly
Attorneys.

Jan. 3, 1928.

C. A. COYLE 1,654,794

FLUID TRANSMISSION

Filed Oct. 17, 1922

Inventor.
Chas. A. Coyle
Gray & Lilly
Attorneys.

Jan. 3, 1928. 1,654,794
C. A. COYLE
FLUID TRANSMISSION
Filed Oct. 17, 1922   3 Sheets-Sheet 3

Inventor,
Chas. A. Coyle.
Gray & Lilly
Attorneys.

Patented Jan. 3, 1928.

1,654,794

UNITED STATES PATENT OFFICE.

CHARLES A. COYLE, OF PORT JEFFERSON, NEW YORK.

FLUID TRANSMISSION.

Application filed October 17, 1922. Serial No. 595,114.

My invention relates to fluid transmission devices, and more especially to fluid transmission devices suitable for use in automobiles.

One object of my invention is to provide a device of the kind that may be governed by one lever to transmit any degree of relative speed from a reverse movement to a forward movement equal to or even greater than that of the driving member.

Another object is to provide such a device that may be used as a clutch when it is desired to transmit speed equal to that of the driven member.

Another object is to so arrange such a device that it may be readily installed in place of the usual fly wheel on an automobile.

These and other objects are attained by a structure in accordance with the principles of the device hereinafter described in connection with the accompanying drawings, in which.

Within a casing, 10, there is mounted a rotor, 11, attached to the drive shaft, 12, by the flanges, 13, and bolts 14 or in any other desired manner. The driven shaft 15, enters the casing through a bearing, 16, and has a crank pin, 16ª, to which power is applied. A pin, 17, on the opposite end of the crank from the shaft, 15, is mounted in a socket in the rotor and helps to steady the crank.

In the rotor there are two sets of cylinders, one set being radial and the other axial. As shown, there are three cylinders in each set, that being the minimum number which will give satisfactory results. The three radial cylinders, 18, are alike. In each there is a piston, 19, and these are connected by piston rods, 20, 21 and 22, to the crank pin, 16ª, rods 21 and 22 being forked so that each may be independently and symmetrically connected to the crank pin.

Fixed upon the driven shaft 15 there is a pinion, 23, and mounted on the rotor there are three pinions, 24, in mesh with the pinion, 23, and each in mesh with a gear, 25, on the end of a rotary valve 26, controlling the fluid supply to a radial cylinder.

Figure 2:
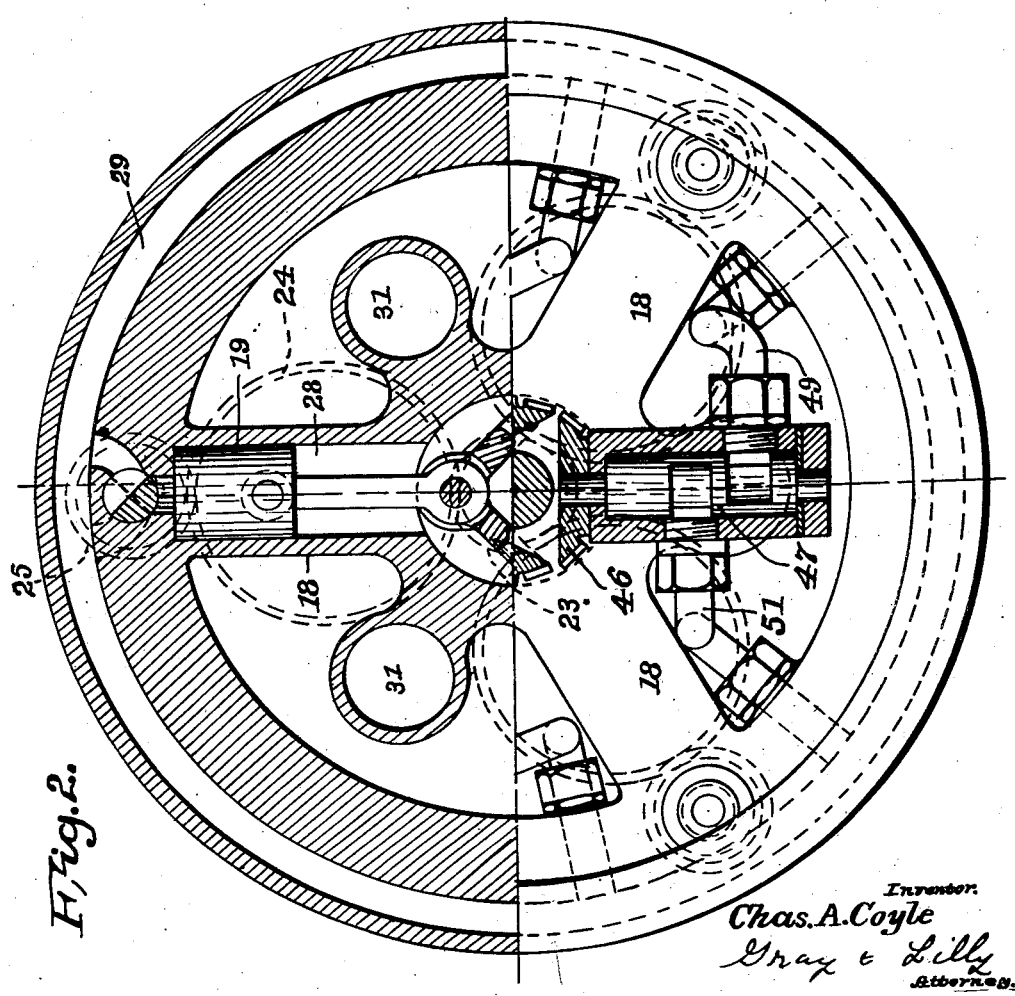
Fig. 2 is a section on the line 2—2 of Fig. 1.
Figure 4:
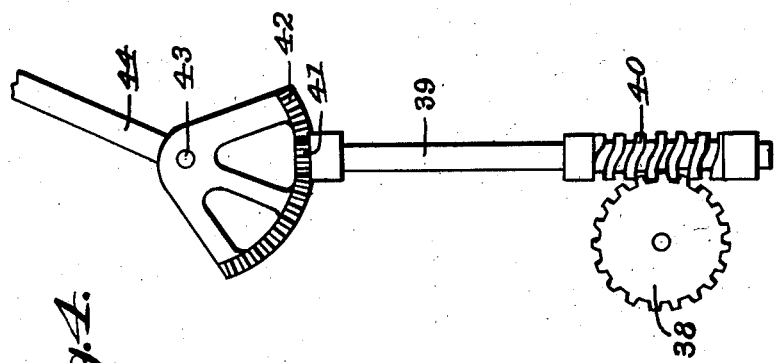
Fig. 4 is a partial side view showing the control mechanism.
Figure 3:
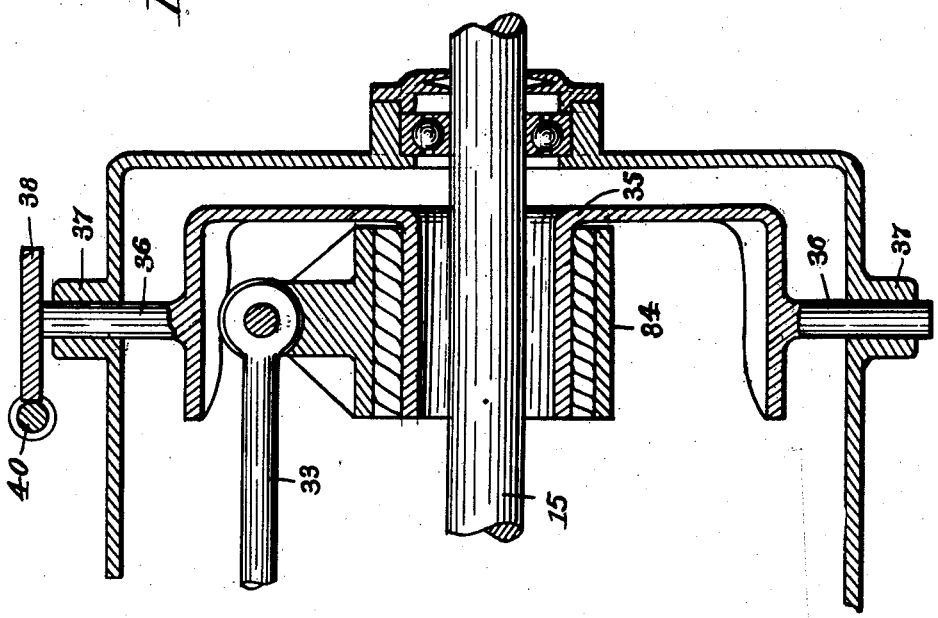
Fig. 3 is a section on the line 3—3 of Fig. 1.

Two parallel annular chambers 27 and 29 are formed in the rotor outside of the radial cylinders. In the position in which the valve is shown in section in the drawings, and supposing the rotor as viewed in Fig. 2 to be rotating in a clockwise direction and the driven shaft to be stationary or moving at a slower speed, the valve is just opening connection between the chamber 27 and the corresponding cylinder port 28 while it is just closing communication between the chamber 29 and the port 30. Under these circumstances it is clear that if pressure is greater in chamber 29 than it is in chamber 27 there is a tendency to drive the driven shaft in the same direction as the drive shaft, while if the pressure is greater in chamber 27 than in chamber 29, the tendency is to drive the driven shaft in the reverse direction from the drive shaft. For this reason it is necessary to use positively actuated valves rather than check valves if the device is to be used to drive the driven shaft in either direction desired.

The three axial cylinders 31, each has a piston, 32, connected by a piston rod, 33, to a collar, 34, rotatable upon an adjustable bearing, 35. This bearing, 35, is supported by trunnions, 36, mounted in bearings, 37, in the casing, and to one of these trunnions is fixed a worm wheel 38. A shaft, 39, has near one end a worm, 40, in engagement with the worm wheel, 38, while on its other end is a pinion, 41, in engagement with a rack, 42, mounted to be moved by a rock shaft, 43, a convenient handle, 44, governing the rock shaft and so, through the worm and worm wheel, the angle of the bearing. It will be noted that the bearing may be moved so that the lower part of the collar as shown in Fig. 1 may be moved either to the left or to the right.

Fixed to the casing is a rack 45 in engagement with three bevel gears, 46, each governing the valve, 47, of one of the axial cylinders. The valve shown in section is just opening communication between the cylinder port 48 and the pipe 49 leading from channel 29 while it is just closing connection between port 50 and pipe 51 leading to chamber 27.

With the device adjusted as shown, there can be no movement of the pistons 32, therefore no circulation of fluid, and the device acts as a clutch, locking together the drive shaft and driven shaft. If the lower side of the adjusting collar, 34, as shown in Fig. 1, be swung to the left, then the radial cylinders may act as a pump, forcing fluid into chamber 29, and the axial cylinders act as a motor resisting the passage of the fluid from chamber 29 to chamber 27, until the capacity of the axial cylinders equals that of the radial cylinders, when the axial cylinders will no longer resist the passage of the fluid at the speed it is forced by the radial cylinders and shaft 15 may remain idle while the drive shaft revolves. If the lower side of the collar is then swung still further to the left, increasing the capacity of the axial cylinders beyond that of the radial, then the axial cylinders will act as a pump, create an excess of pressure in chamber 27, and cause the radial cylinders to act as a motor, moving the driven shaft in a direction the reverse of that of the drive shaft.

Figure 1:
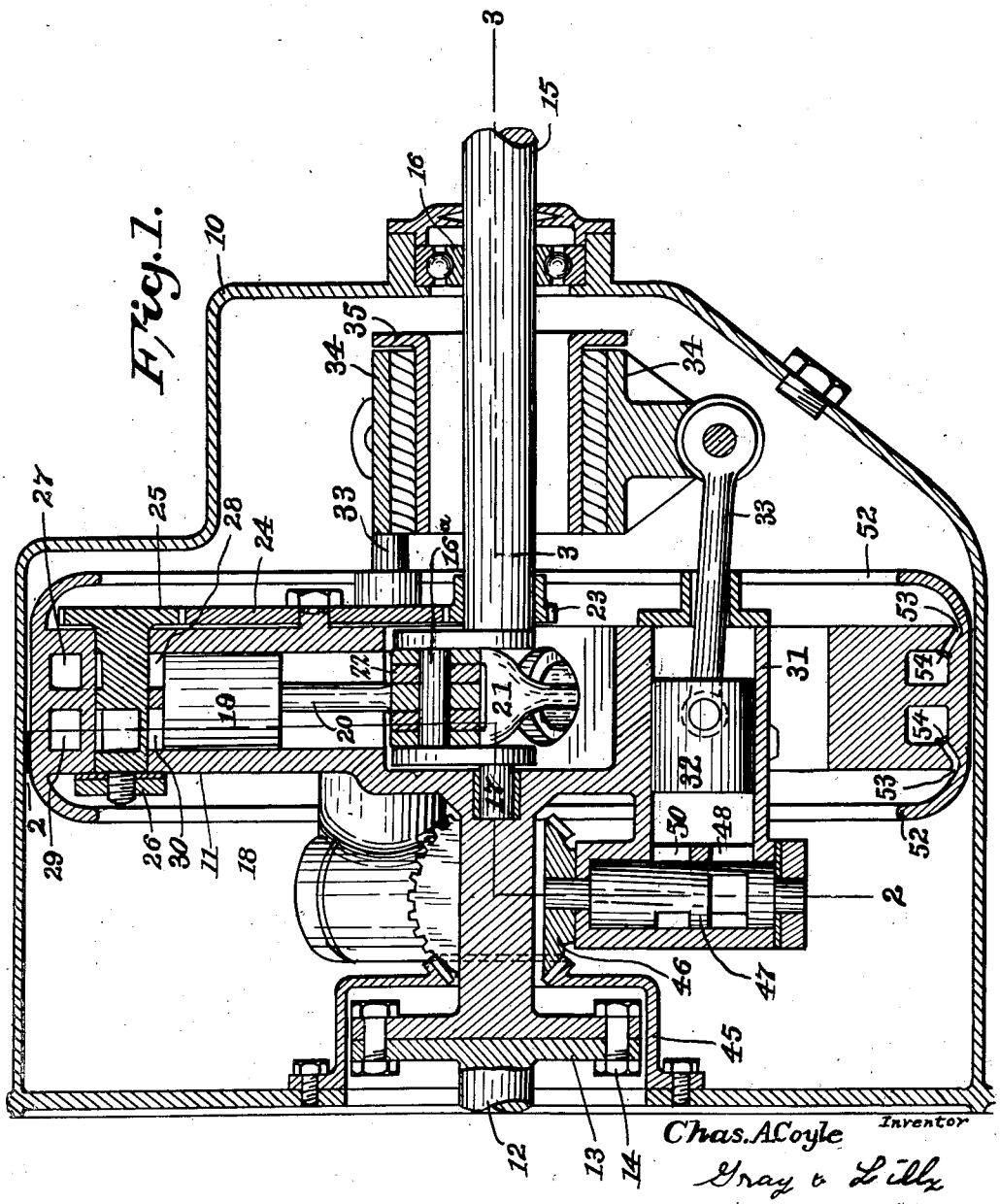
Figure 1 is a longiudinal section of the device.

If, however, the lower side of the adjusting collar is swung to the right from the position shown in Fig. 1, the port 48 will act as an exit instead of an entrance port, the axial cylinders will act as a pump and the radial cylinders as a motor in the reverse direction from that previously described, the driven shaft being driven faster than the drive shaft, the direction of the rotation of valves 26 being reversed as the direction of the flow of fluid is reversed.

There is some inevitable leakage of the oil or other fluid used, and to keep the circulating system constantly full I provide flanges, 52, which run in oil in the lower part of the casing and, when any considerable speed is attained, remain full of oil. Channels, 53, from within these flanges, lead into chambers 27 and 29, and are governed by check valves, 54, thus allowing entrance of oil into either of the chambers which may, at the time, be insufficiently full, while preventing exit from either chamber which may be acting as a pressure chamber.

The worm and worm wheel act as an automatic lock tending to hold the adjusting collar in adjusted position, and it will be seen that by the use of a single lever the device may be adjusted so that the motion transmitted will pass evenly and smoothly from a reverse motion of the driven shaft through a motionless stage to a speed equal to or, if desired, greater than the driven shaft. It will be apparent, also, that the device is very compact and of a shape suitable to be installed in place of the fly wheel and clutch of many automobiles, the rotor being adapted to act not only as a transmission, but also as a clutch and fly wheel.

It is desirable, also, that the flow of liquid shall be maintained as nearly as possible uniform, and it is worthy of note that while one cylinder or two oppositely disposed cylinders would vary the flow from nothing to maximum twice during each revolution, and four cylinders arranged 90° apart would vary from a minimum to a maximum 1.4 times as great four times during each revolution, there is comparatively little variation in the flow from three cylinders symmetrically arranged.

It is worthy of note, also, that the pistons of the axial cylinders are pinned to the collar at a greater distance from the center of revolution than the center of the cylinders, so that when the collar is adjusted, the approach towards the center of revolution as well as the lateral movement of the swung portion of the collar increases the throw of piston.

While, as explained above, either radial or axial cylinders may act as pump or motor according to the adjustment, for the purposes of the appended claims the radial cylinders are called pump cylinders and the axial cylinders are called adjuster cylinders.

While I prefer the arrangement and combination of features shown, it is evident that some of the features might be used in other combinations and various changes could be made and retain advantages of my invention, and I do not limit my invention beyond the terms of the appended claims.

I claim:

1. In combination, a drive shaft and a driven shaft in axial alinement, a rotor attached to the drive shaft and surrounding the driven shaft and having therein two annular chambers, three symmetrically arranged radial cylinders, three symmetrically arranged cylinders parallel to the axis and a passage between each cylinder and each chamber, a piston in each cylinder and a valve in each passage, the pistons in said radial cylinders being operatively connected with said driven shaft, means to positively actuate the pistons and valves of the radial cylinders according to the relative movements of the shafts to pump fluid from one of the chambers to the other, and stationary means for positively actuating the valves of the axial cylinders and stationary means for governing the movements of the pistons of the axial cylinders, said last named stationary means being adjustable so as to adjust through the movements of the pistons in the radial cylinders the amount of fluid that passes from one chamber to the other during a revolution of the drive shaft.

2. In a fluid transmission device, a casing, two shafts entering the casing, a rotor within the casing having therein two sets of cylinders, two annular chambers near the outside of the rotor and a passage between each cylinder and each chamber, flanges on the rotor outside of the chambers and forming with the face of the rotor oil troughs that will fill with oil from the lower part of the casing when the rotor rotates, passages from the troughs to the chambers having check valves allowing entrance but blocking exit, means attaching the rotor to one shaft, means governing the passage of fluid from one chamber to the other through one set of cylinders in accordance with the relative movements of the shafts, and adjustable means governing the return of the fluid from the second chamber to the first through the second set of cylinders in accordance with the rotation of the rotor.

3. In an automobile, a drive shaft, a driven shaft, a rotor attached to the drive shaft and having therein two chambers, two sets of cylinders alternately arranged, the cylinders of one set being radial and the cylinders of the other set being parallel with the axis of the rotor, and passages between each cylinder and each chamber, means including positively actuated valves for governing the passage of fluid from the chamber through one set of cylinders to the other chamber in accordance with the relative rotation of the shafts, and other means including positively actuated valves for governing the return of fluid from the second chamber to the first through the second set of cylinders in accordance with the rotation of the rotor, one of said means being adjustable to such an extent that either set of cylinders may be made to act as a motor and the other as a pump.

4. In an automobile, a drive shaft, a rotor attached to the drive shaft and adapted to act as a fly wheel, said rotor having therein a set of radially disposed cylinders with a set of cylinders arranged alternately with the radial cylinders and extending parallel to the axis of the rotor, two annular chambers extending around the rotor outside of the cylinders and a passage between each cylinder and each chamber, a valve within each passage and a piston within each cylinder, a driven shaft, an eccentric device on the driven shaft and means connecting said device to the pistons of the radial cylinders, a collar attached to the pistons of the axial cylinders, a bearing for the collar mounted on trunnions so that the angle of the collar to the pistons may be varied, and means moving the valves in accordance with the movements of their respective pistons.

5. In an automobile, a casing, a drive shaft entering one end of the casing, a rotor within the casing attached to the drive shaft and having therein two chambers, a set of radial cylinders, a set of cylinders parallel with the axis of the rotor, the radial and axial cylinders alternating in a circle, and passages between each chamber and each cylinder, a valve in each passage, a piston within each cylinder, means attached to the end of the casing around the drive shaft governing the valves of one set of cylinders, stationary means controlling the movements of the corresponding pistons, a driven shaft, means on the driven shaft governing the movement of the other set of pistons and means on the driven shaft governing the corresponding set of valves, one of said piston governing means being adjustable to give its pistons greater or less displacement than the other set of pistons for one revolution of the pistons relative to their governing means.

6. In an automobile, a casing, a drive shaft entering one end of the casing, a rotor attached to the drive shaft within the casing and adapted to act as a fly wheel, the rotor having therein two annular chambers, a set of radial cylinders, a set of cylinders alternating with the radial cylinders and extending parallel with the axis of the rotor, and passages connecting each cylinder with each chamber, the cylinders, chambers and passages together forming a closed circuit within the rotor, a valve in each passage, a piston in each cylinder, means on the wall of the casing around the drive shaft actuating the valves of the axial cylinders, an adjustable stationary device mounted in the other end of the casing governing the throw of the pistons within the axial cylinders, a driven shaft entering the casing in axial alinement with the drive shaft, a crank on the driven shaft connected to the pistons of the radial cylinders, and means on the driven shaft actuating the valves of the radial cylinders.

In testimony whereof I hereunto affix my signature.

CHARLES A. COYLE.